US008788353B2

(12) United States Patent
Hills

(10) Patent No.: US 8,788,353 B2
(45) Date of Patent: Jul. 22, 2014

(54) SYSTEM AND METHOD FOR PRESENTING A FINANCING INSTRUMENT AT A POINT OF SALE

(71) Applicant: Hardison Holding Company, LLC, Myrtle Beach, SC (US)

(72) Inventor: Robert R. Hills, Chipley, FL (US)

(73) Assignee: Hardison Holding Company, LLC, Myrtle Beach, SC (US)

( * ) Notice: Subject to any disclaimer, the term of this patent is extended or adjusted under 35 U.S.C. 154(b) by 0 days.

(21) Appl. No.: 13/692,437

(22) Filed: Dec. 3, 2012

(65) Prior Publication Data

US 2014/0156433 A1    Jun. 5, 2014

(51) Int. Cl.
*G06G 1/12* (2006.01)
*G06Q 40/00* (2012.01)

(52) U.S. Cl.
USPC ............................................ 705/21; 705/44

(58) Field of Classification Search
USPC ............................................................ 705/21
See application file for complete search history.

(56) References Cited

U.S. PATENT DOCUMENTS

| 7,606,764 | B1 | 10/2009 | Mancini |
| 7,822,679 | B1 | 10/2010 | Vaux et al. |
| 8,065,227 | B1 | 11/2011 | Beckman |
| 8,065,233 | B2 * | 11/2011 | Lee et al. ......................... 705/44 |
| 8,121,922 | B2 | 2/2012 | Walker et al. |
| 8,165,962 | B1 * | 4/2012 | LeKachman .................... 705/44 |
| 2005/0283436 | A1 | 12/2005 | Greer et al. |
| 2007/0061255 | A1 | 3/2007 | Epting et al. |
| 2009/0171840 | A1 * | 7/2009 | Raz et al. ......................... 705/40 |

* cited by examiner

*Primary Examiner* — Garcia Ade
(74) *Attorney, Agent, or Firm* — The Marbury Law Group, PLLC

(57) ABSTRACT

A system and method for extending credit to a purchaser at a point-of-sale terminal. A merchant registers with a host system operated by or for a lending financial institution. The host receives a request for an installment purchase agreement from a purchaser-borrower. The installment purchase agreement represents a payment instrument for payment to the merchant of a purchase price for goods or services selected for purchase by the purchaser-borrower from the merchant. The host system receives financial information from the purchaser-borrower and velocity data accessible to the host system. The host may determine from the financial information received from the purchaser-borrower whether the credit worthiness of the purchaser borrow exceeds a first threshold and determine from the velocity data whether a risk factor exceeds a second threshold.

13 Claims, 2 Drawing Sheets

SYSTEM AND METHOD FOR PRESENTING A FINANCING INSTRUMENT AT A POINT OF SALE

BACKGROUND

The following description of the background of the invention is provided simply as an aid in understanding the invention and is not admitted to describe or constitute prior art to the invention.

A point of sale (POS) may be a physical location, such as a store front or vendor's cart, or a virtual location such as a call-in number or website. A POS transaction is an exchange between a buyer that results in a purchase of goods or services in exchange for payment or a promise to make payment. A POS transaction may involve cash or an electronic funds transfer from a purchaser's financial institution to the financial institution of a merchant.

A POS sale may also involve the use of a credit card. In a credit card transaction, the merchant and the purchaser each have a contractual relationship with a card issuer. The card issuer agrees to pay the merchant the amount of the purchase price of the goods or services, and the purchaser agrees to pay the card issuer. The merchant is charged a fee that is at least in part determined by the amount of the charges incurred by the merchant's customers.

The risk on non-payment is allocated between the merchant and the merchant's processor according to the terms of the contract between them. Typically, if the merchant obtained all required information from the purchaser and followed all of the rules and regulations, the financial institution would bear the liability for the fraud. If the merchant did not get all of the necessary information, the merchant would be required to return the funds to the financial institution.

One option that is not available at the POS is the creation of a financing instrument that establishes a purchaser's obligation to pay for goods and/or services in installments while providing a merchant payment in full. Typically, such financing instruments, if available at all, are separately negotiated. While a purchaser may authorize a merchant to draw money from a purchaser's account or charge a purchaser's credit card on a recurring basis, the merchant is not paid in full until the payment cycle is completed. Separately negotiated installment instruments may also result in the merchant receiving less than full payment for the goods and services provided.

SUMMARY

Embodiments herein are directed to process for presenting a financial instrument to a purchaser-borrower at a POS, determining the credit worthiness of the purchaser-borrower, and granting or denying the extension of credit.

In an embodiment, a host system comprises a centralized data capture system capable of evaluating for "Approval" purchaser-borrower requests for an installment loan agreement from service-subscribing merchants or businesses.

Each such transaction entails a purchaser-borrower being extended credit, via an application that is evaluated by the host system under a fully automated process. When the host system validates the reliability and credit-worthiness of the purchaser-borrower, the host system issues an approval response, including the resulting payment schedules and documents that are required to be executed obligating the purchaser-borrower to make payments by means of scheduled automated debits for credit to the lending financial institution.

DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Various embodiments herein will be described below with reference to the accompanying drawings. It should be understood that the following description is intended to describe exemplary embodiments are invention, and not to limit the invention.

Embodiments herein are directed to process for presenting a financial instrument to a purchaser-borrower at a POS, determining the credit worthiness of the purchaser-borrower, granting or denying the extension of credit, executing all documents, and the processing of the purchaser-borrower's initial and all subsequent installment payments.

Figure 1:
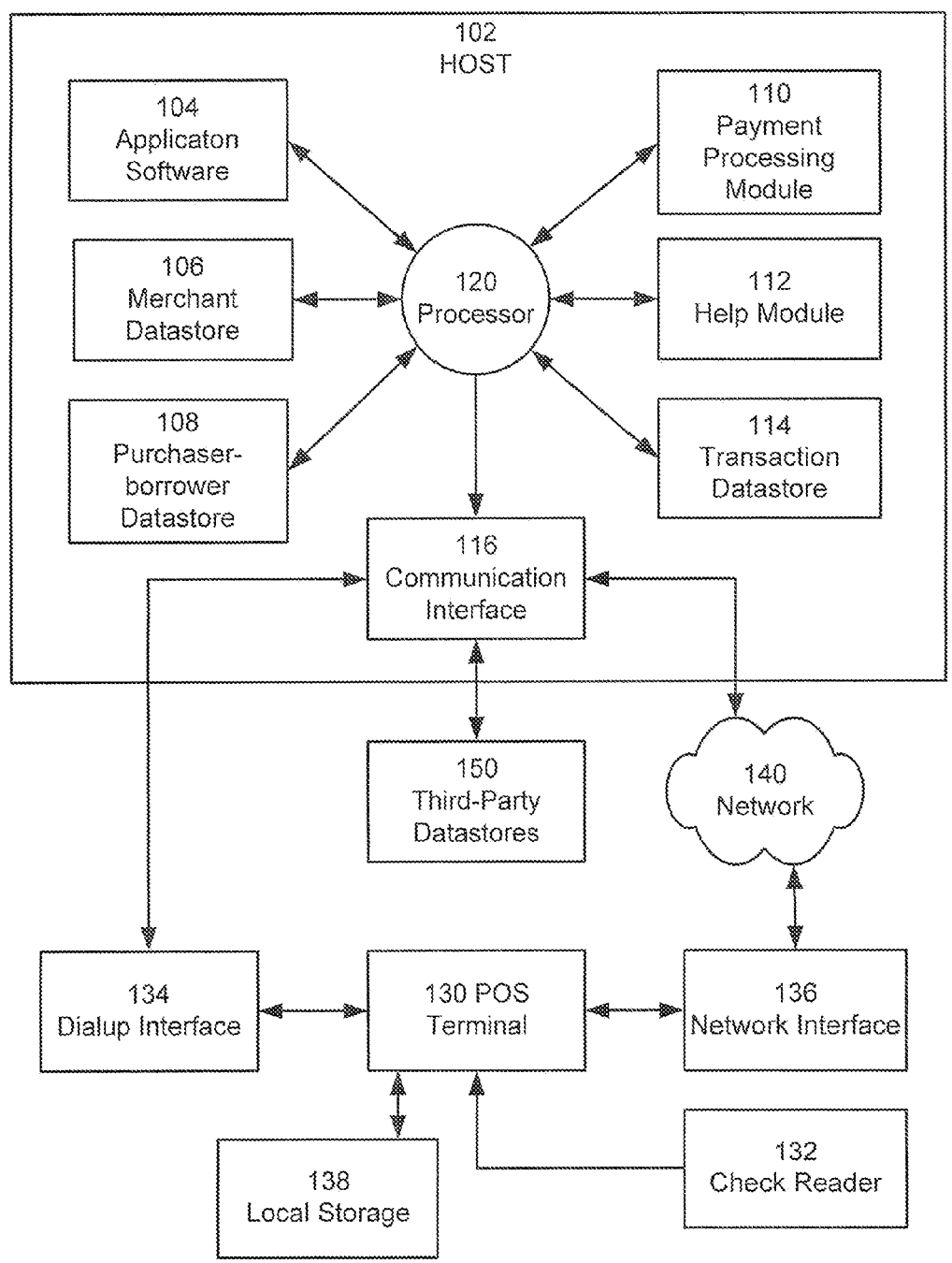
FIG. 1 is a block diagram illustrating a host system for creating a financial instrument at a point of sale according to an embodiment.

Referring to FIG. 1, a host 102 includes a processor 120. The processor 120 executes application software 104 residing in a memory (not illustrated). The processor 120 also communicates with a communication interface 116 to receive data from a point of sale (POS) terminal 130. The POS terminal 130 may be a dedicated device or it may be implemented on a computing device. The communications interface 116 may be configured to receive data from the POS terminal 130 via a dialup interface 134 or a network interface 136 via a network 140.

In an embodiment, the network 140 may be the Internet. In other embodiments, the network may be a proprietary or intranet network.

The application software 104 includes software executable instructions to enable the host 102 to administer and approve financing requests submitted by a purchaser-borrower as described below. The purchaser-borrower may request a financing period, for example, 3, 6, or 12 months. If the financing request is approved, the merchant is paid by the financial institution that underwrites the loan. The merchant is not a party to the financing agreement.

The host 102 includes a merchant datastore 106 that stores information relating to participating merchants. By way of illustration and not by way of limitation, the merchant datastore 106 may include merchant name, address, financial institution and account identifiers, and terms and conditions that establish the contractual relationship between a participating merchant and the lending institution that issues the financial instrument to the purchaser-borrower.

The host 102 includes a purchaser-borrower datastore 108 that stores information relating to purchaser-borrowers who submit requests for credit to the host 102. By way of illustration and not by way of limitation, the purchaser-borrower datastore 108 may include the purchaser-borrower's name, address, payment sources and account identifiers, and terms and conditions that establish the contractual relationship between the purchaser-borrower and the lending institution that issues the financial instrument to the purchaser-borrower.

The host 102 includes a payment processing module 110 that includes software executable instructions to enable the host 102 to execute processes for electronic payment, capturing and settling. One source for payment would be a purchaser-borrower's depository checking account. In other embodiments, payment sources may include credit and/or debit cards that have been preauthorized by the purchaser-borrower for automated debits for a purchaser-borrower's initial payment and each monthly installment obligation.

The host 102 includes a help-desk module 112 that includes software executable instructions and permitted human interface to enable the host 102 and/or host-based personnel to provide immediate access to "live" data to provide assistance to purchaser-borrowers in completing forms and to assist merchants in dealing with open transactions.

The host 102 includes a transaction datastore 114 that creates and stores historic DD/MM/YYYY files for processing activity closed by subscribing merchants involving the total of each day's total loan requests, whether approved or declined.

In an embodiment, the collection of information from the purchaser-borrower, and the accuracy of information so received, may be facilitated by a check reader 132. In an embodiment, the check reader 132 is configured to provide data from checks in a packet format that is accepted by the host 102. In another embodiment, an existing check reader may be reprogrammed or reconfigured to provide this functionality.

In an embodiment, the POS terminal 130 is configured to identify a transaction as a request for authorization of an installment purchase instrument to pay for goods or services submitted to the host 102 by a participating merchant. By way of example and not by way of limitation, the identification of such a transaction request may be accomplished by a "keystroke" identifier that would differentiate the "type" of transaction intended to be performed by a merchant.

The PUS terminal 130 may access local storage device 138. Local storage device 138 provides temporary storage of individual or daily activity between a service subscribing merchant or business with its customers electing to submit a lending request to the host 102 for a portion or total of a purchase. Information inputted manually or through a check reader may be locally stored and, once all data has been collected, packeted for communication with the HOST System. Thereafter, local storage device 138 would retain all salient data until a days events (approved and declined loan activity) were balanced, reports printed (optional), and the days activity, or "batch", "Closed" in communication with the host 102.

In an embodiment, the approval of a lending request does not rely on the requesting party's (purchaser-borrower's) credit score. Rather, the host 102 applies one or more operations to a financing request to determine whether the request should be granted. As will be described below, these operations may include an automated "soft-hit" inquiry to a credit bureau but do not include a "hard hit" credit score inquiry.

In an embodiment, identifiers may be used in a financing request to signal the host 102 which processes to apply to the request. A financing request may comprise a transaction string containing lead identifiers that may be used to identify the subscribing merchant and the specific terminal/computer location from which a request for financing originates. Identifiers may also be used to identify a consumer's permitted and preferential payment source (bank depository account or credit card), thereby routing the approval process accordingly.

When a bank depository account is used as the payment source, the routing and transit numbers may be acquired by scanning a specimen check using a check reading device. The host 102 may perform a MOD10 validation of the bank routing and transit number. This process may be performed on all bank accounts or reserved for situations in which the bank routing and transit number are acquired manually. In an embodiment, an identifier may be used to signal the host 102 that an inquiry is being presented by manual entry, presumably due to an unreadable specimen at the point-of-sale, and thereby mandating heightened scrutiny of the financing request.

When the payment source is a credit card, the host 102 may perform a test preauthorization before a request is approved.

In another embodiment, the financing request includes social security number of the purchaser-borrower. The host 102 stores and searches the string numbers of validly issued social security numbers to determine whether the number is valid. The host 102 may then cross search the social security number against the database of those validly issued social security numbers subsequently reported as issued to deceased parties.

Social security numbers may also be used to establish lending rules. For example, a financing request that includes a social security number issued for "Work Purposes Only" may be denied as an unacceptable risk. Additionally, the social security number included in the financing request may be used to search the purchaser-borrower datastore 108 to identify requests from individuals known to the host 102 who have defaulted on previous financing agreements or who may have attempted fraud.

In an embodiment, driver's license numbers may also be acquired in a financing request and used to determined the creditworthiness of an individual requesting financing.

The purchaser-borrower datastore 108 maintains records for each lending inquiry, whether ultimately approved or declined, submitted from a service-subscribing merchant location. The record may include a payment history of a purchaser-borrower. The record may also be identified by a status flag indicative of a standing of the purchaser-borrower as derived from a prior installment loan application and/or loan history. By way of illustration and not by way of limitation, the status flag of a new purchaser-borrower may be assigned a value of "N," the status flag an existing purchaser-borrower with a good payment history may be assigned a value of "T," and the status flag an existing purchaser-borrower with a poor payment history may be assigned a value of "F." The application software 104 would evaluate the flag before approving for rejecting) any new inquiry.

The status field values may be used to expedite the handling of new financing request from a known individual by allowing the host 102 to bypass one or more evaluation processes otherwise required for "first use" individuals. For example a subsequent inquiry from a "known" individual for payment from the identical source account whose record reflects a status value of "T," could be approved subject only to merchant limit criteria and consumer velocity restrictions as described below.

An individual who has a record in the purchaser-borrower datastore 108 may submit a financing request that indentifies a new (unrecognized) source of payment. Under these circumstances, the host 102 may perform a cross search of the purchaser-borrower datastore 108. The new inquiry will be responded to in accordance to the "T/F" status on the known Consumer Record. Where the individual is in default from an alternate account (i.e., status is F), the new financing request will be decline. A record having a status of T would be approvable subject to compliance with merchant limits and consumer velocity criteria describe below.

The host 102 also evaluated a financing request against lending limits provided by the subscribing merchant or established by the lending financial institution. In an embodiment, a financing request from an individual that exceeds an established lending limit would be "Rejected" rather than "Declined" and so signified in a response from the host 102 to the POS terminal or computer from which the request was initiated.

The host 102 may also review a financing request against velocity criteria, such as the frequency, numeric count of approved borrowings, and cumulative total of combined borrowings per purchaser-borrower record. In an embodiment, the individual factors for a particular record may be customized by the lending financial institution based upon the history derived from extended payment arrangements for previous or current borrowings.

In an embodiment, the processor 120 communicates with various third party datastores 150 via the communication interface 116. In an alternate embodiment (not illustrated), the third party datastores 150 are collocated within the host 102. When located within the host 102, the third party datastores 150 are regularly updated to remain current. For example, when a financing request is submitted by an individual not known to the host 102, or when a financing request originates from a known individual using a new payment sources, host 102 may access various checkwriter authorization databases and/or may access credit bureaus to obtain "soft-hit" access to purchaser-borrower payment histories.

As used herein, a "soft-hit" inquiry encompasses access to credit bureau data regarding an individual's payment history with regard to existing financial obligations. The soft-hit inquiry does not impact the individual's credit score (as would a "hard-hit" inquiry) because the inquiry does not access and retain a complete report of the individual.

The data from these sources may be used to evaluate first-time purchaser-borrowers or "known" purchaser-borrowers using a new source payment account. For example, the creditworthiness of the purchaser-borrower may be measured and evaluated against a threshold. In so doing, assessments can be interpreted and automated responses ("Approved" or "Declined.") generated based upon the purchaser-borrower's reliability rather than relying upon approvals resulting from access to, and reliance upon, the purchaser-borrower's credit score.

In an embodiment, limits (sometimes referred to as thresholds) may be imposed on the amount that may be financed by a merchant by means of customizable velocity controls. The velocity controls operate to limit the per sale amount permitted to be conducted with any purchaser-borrower. For example, limitations may be imposed upon the merchant by industry grouping (i.e. HVAC standards versus those imposed for a Medical Facility) and/or by an enrollment election of the merchant limiting its maximum consumer lending request (i.e. electing to restrict purchaser-borrower requests to a maximum $2,000 versus, for example, $5,000) in order to lower processing and service fees. These merchant velocity controls may be include in a merchant's record as stored in the merchant datastore 106. The merchant record may be accessed during the authorization inquiry as a part of each purchaser-borrower financing request thereafter initiated from the affected merchant point-of-sale.

Velocity controls may also be imposed on purchaser-borrowers to minimize the risks associated with incidences of fraud, abuse, and/or misuse of the host 102. In an embodiment, purchaser-borrower velocity controls may be customizable on an individual basis based upon a purchaser-borrower's "known" history. For example, the purchaser-borrower velocity controls may be used to establish limits (thresholds) on a purchaser-borrower's initial sale-financing request, on the amounts permitted from a particular merchant's location and the frequency with which a purchaser-borrower may initiate subsequent borrowing requests. Regarding the latter, a black-out period following an "Approval" of a financial request may be established. The duration black-out period may be changed as more information about the purchaser-borrower's credit worthiness is acquired.

In another embodiment, the host processor 120 of host 102 dynamically establishes velocity thresholds for each purchaser-borrower. For example, the host 102 may be configured with an initial frequency threshold and an initial aggregate outstanding borrowing threshold. As a purchaser-borrow acquires a history with the host 102, the processor 120 may dynamically adjust a current frequency threshold and balance threshold to reflect the purchaser-borrow current credit-worthiness at a point in time as measured by the host 102.

In still another embodiment, the host 102 may further determine whether the credit worthiness of the purchaser-borrower exceeds a financing request limit (or threshold) for that purchaser-borrow and whether the requested sale exceeds limits imposed at a particular merchant's location. As described above, a threshold limit may be established on an individual purchaser-borrower basis to reflect the current credit-worthiness of that purchaser-borrower. Thus, a known purchaser (that is, a purchaser-borrowers with a record in the purchaser-borrower datastore 108), may have threshold limits that differ from limits imposed on an unknown purchaser borrower, and the known purchaser borrower's threshold may vary over time depending on the payment history of the purchaser borrower.

In an embodiment, the host 102 authorizes payment of the merchant in full for the goods or services elected for purchase by the purchaser-borrower based on the credit worthiness of the purchaser-borrower and at least one of the measured velocity of the merchant and the measured velocity of the purchaser-borrower. For example, the host 102 may authorize payment of the merchant when a purchaser-borrower's "measured" creditworthiness and measured velocity are both below their respective thresholds. Alternatively, the measured merchant velocity may be used either in place of the purchase-borrower's velocity or in addition to that velocity to determine whether to authorize payment to the merchant and to grant the purchaser-borrower's request for credit.

Figure 2:
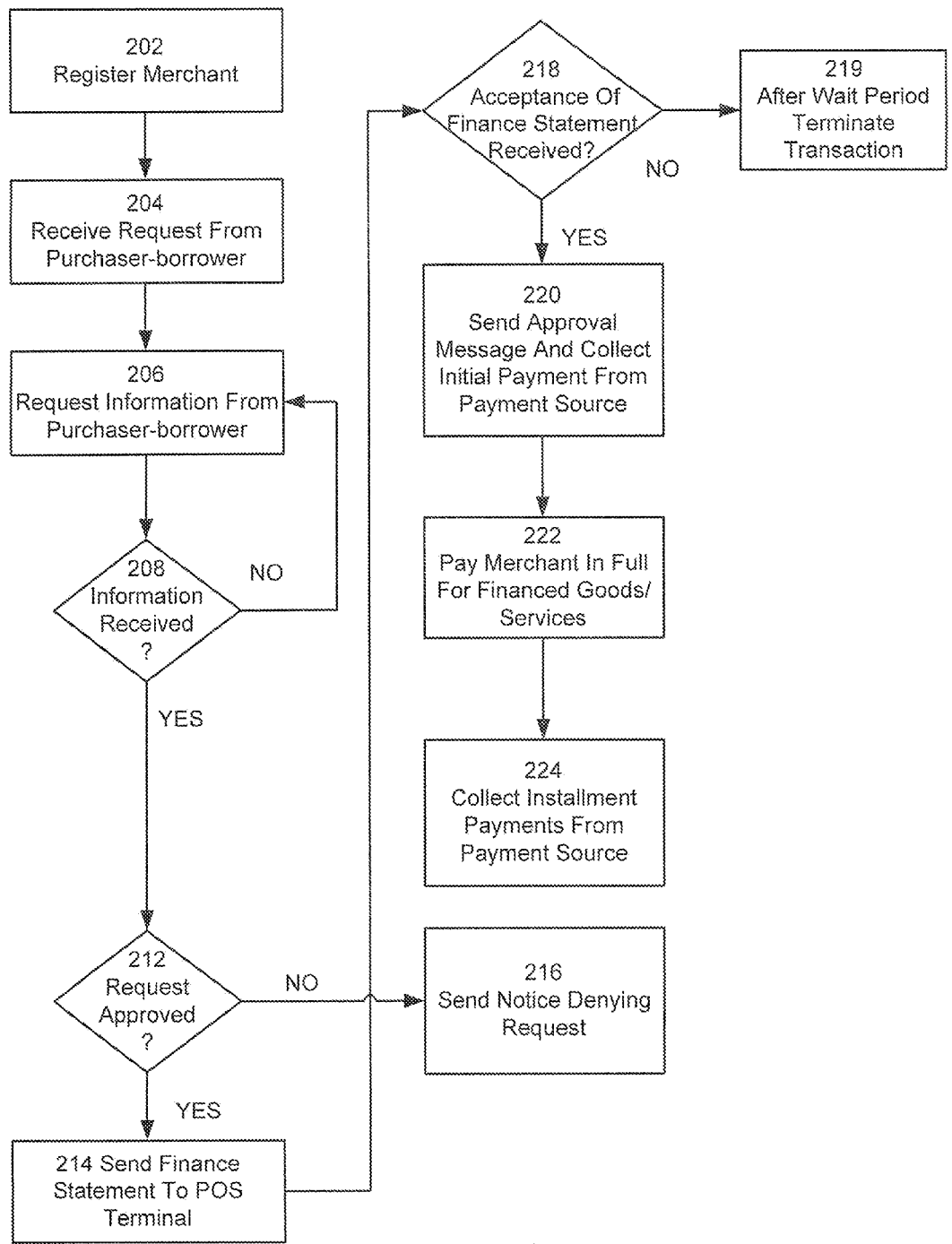
FIG. 2 is a flow diagram illustrating a process by which a financial instrument may be created at a point of sale according to an embodiment.

FIG. 2 is a flow diagram illustrating a process by which a financial instrument may be created at a point of sale according to an embodiment.

Merchants register with the host (Block 202). A request for an installment purchase instrument to pay for goods or services provided by a participating merchant is received from a purchaser-borrower (Block 202) via the POS terminal 130.

The authorization software 104 executed by the processor 120 generates a financing application to collect information from the purchaser-borrower to process the request (Block 208). The financing application is provided to the POS terminal 130 from which the request was sent.

A check is made to determine if all required information has been received 208. If incomplete information was received, that is, if the result of block 208 is "NO," the authorization software 104 executed by the processor 120 may forward an error message thereby requesting that the purchaser-borrower information be properly resubmitted. In an embodiment, the number of times that the purchaser-borrower may resubmit an authorization inquiry request, where repeatedly incomplete, may limited to a predetermined number. Alternatively, the authorization software 104 may be configured to establish a maximum time period for receiving the all mandatory information from the purchaser-borrower. An absence of these manners of limits might otherwise subject the host 102 to an unacceptable susceptibility to purchaser-borrower or merchant-subscriber abuse.

If all required information fields have been received, that is, if the result of Block 208 is "YES," the authorization software 104 executed by the processor 120 operates on the received information to determine whether the purchaser-borrower qualifies for the requested installment purchase instrument (Block 212) as previously described. If the purchaser-borrower does not qualify for the requested installment purchase instrument, that is, if the result of Block 212 is "NO," a notification denying the request is returned to the POS terminal 130 from which the request was sent (Block 216). If the purchaser-borrower qualifies for the requested installment purchase instrument, that is, if the result of Block 212 is "YES," a finance statement is sent to the POS terminal 130 from which the request was sent (Block 214). The authorization software 104 executed by the processor 120 also acts on the received information to create an account for the purchaser-borrower, whether the request has been approved or declined, that is stored in a purchaser-borrower-borrower datastore 108.

A determination is then made regarding whether the purchaser-borrower has executed and returned the finance statement after a preset period of time (Block 218). If the purchaser-borrower has not executed and returned the finance statement after a preset ("timeout") period of time, that is, the result of Block 218 is "NO," the transaction is terminated (Block 219). If the purchaser-borrower executes and returns the finance statement within the preset period of time, that is, the result of Block 218 is "YES," an approval message is sent to the PUS terminal from which the request originated and an initial payment is collected from a payment source identified in the information provided by the purchaser-borrower in steps 206 and 208 (Block 220). The merchant will then be paid in full for the goods and/or services covered by the finance statement (Block 222) pursuant to the terms and provisions of its contractual relationship as a service-subscriber to the host 102. Thereafter, installment payments are collected from the purchaser-borrower's payment source in accordance with the terms of the finance statement (Block 224).

In an embodiment, the host 102 may determine from the financial information received from the purchaser-borrower whether the credit worthiness of the purchaser borrow exceeds a first threshold and determine from the velocity data whether a risk factor exceeds a second threshold. In this embodiment, the host 102 authorizes payment of the merchant in full for the goods or services elected for purchase by the purchaser-borrower when the purchaser-borrower when both the first and second thresholds are exceeded.

In an embodiment, the request for an installment purchase instrument to pay for goods or services provided by a participating merchant is received from a purchaser-borrower in advance of the purchase. That is, the purchaser-borrower requests pre-approval of the transaction from a computer or terminal located at a kiosk or from a computer device owned by the purchaser-borrower. If by computer device owned by the purchaser-borrower, the pre-approval request would but be identified as being for the benefit of a specific service-subscribing merchant or business.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software ma be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for extending credit to a purchaser-borrower at a point-of-sale terminal, the method comprising:
    registering by a processor a merchant with a host system operated by or for a lending financial institution;
    receiving by the processor via a terminal operated by or for the registered merchant a request for an installment purchase agreement from a purchaser-borrower, wherein the request is made in the course of a transaction for the purchase of goods or services selected for purchase by the purchaser-borrower from the registered merchant and the installment purchase agreement represents a payment instrument for payment to the registered merchant of a purchase price for the goods or services;
    sending by the processor a request to the terminal operated by or for the registered merchant for financial information from the purchaser-borrower;
    sending by the processor a request to the host system for velocity data;
    receiving by the processor the financial information and the velocity data;
    determining by the processor from the financial information received from the purchaser-borrower whether the credit worthiness of the purchaser-borrower exceeds a first threshold;
    determining by the processor from the velocity data whether a risk factor exceeds a second threshold; and
    authorizing by the processor payment of the registered merchant in full by the lending financial institution for the goods or services elected for purchase by the purchaser-borrower when both the first and second thresholds are exceeded.

2. The method of claim 1, wherein the velocity data are selected from the group consisting of a frequency of requests from the purchaser-borrower, a count of rejected requests, a count of approved requests, and a cumulative total of combined borrowings by the purchaser-borrower.

3. The method of claim 1, wherein the financial information comprises a bank routing/transit number and wherein the evaluating step comprises a Mod Ten computation on the routing/transit number.

4. The method of claim 1, wherein the financial information comprises a social security number of the purchaser-borrower and wherein the evaluating step comprises determining from a record whether the social security number is assigned to a person known to be deceased or is identified as for work purposes only.

5. The method of claim 1, wherein the financial information comprises a social security number of the purchaser-borrower, wherein the host system comprises an historical transaction datastore, wherein historical transaction datastore comprises records of prior requests for installment purchase agreements associated with social security numbers of each requesting party, and wherein the evaluating step comprises cross checking the social security number of the purchaser-borrower with the data store records to determine a risk history of the purchaser borrower.

6. The method of claim 5, wherein the risk history comprises criteria selected from the group consisting of a loan frequency, an approval amount, and a measure of cumulative outstanding loans.

7. The method of claim 1, further comprising pre-authorizing payment of sums due under the installment purchase agreement from an account of the purchaser-borrower when the purchaser-borrower is credit worthy as determined from the financial information.

8. The method of claim 7, wherein the account of the purchaser-borrower is selected from the group consisting of a bank account, a credit card or a debit card.

9. The method of claim 1, wherein the merchant is selected from the group consisting of a brick-and-mortar merchant and a web-based merchant.

10. The method of claim 1, wherein the services comprise medical services.

11. The method of claim 1, wherein the request for an installment purchase agreement from a purchaser-borrower is received in advance of the purchase of goods or services from the merchant.

12. The method of claim 11, wherein the point-of-sale terminal is selected from the group consisting of a terminal or computer located at a kiosk and a computer operated by the purchaser-borrower.

13. The method of claim 1, wherein the method further comprises:
    receiving by the processor a payment history of the purchaser-borrower; and establishing by the processor the first threshold using the payment history.

* * * * *